US009803072B2

(12) United States Patent
Han et al.

(10) Patent No.: US 9,803,072 B2
(45) Date of Patent: Oct. 31, 2017

(54) RESIN COMPOSITION AND MOLDED ARTICLE USING THE SAME

(71) Applicants: Hyundai Motor Company, Seoul (KR); Kia Motors Corporation, Seoul (KR); LG Hausys, Ltd., Seoul (KR)

(72) Inventors: In Soo Han, Gyeonggi-do (KR); Myoung Ryoul Lee, Seoul (KR); Kie Youn Jeong, Gyeonggi-do (KR); Dea Jong Baek, Busan (KR); Yun Ho Lee, Ulsan (KR)

(73) Assignees: Hyundai Motor Company, Seoul (KR); Kia Motors Corporation, Seoul (KR); LG Hausys, Ltd., Seoul (KR)

( * ) Notice: Subject to any disclaimer, the term of this patent is extended or adjusted under 35 U.S.C. 154(b) by 0 days.

(21) Appl. No.: 14/967,336

(22) Filed: Dec. 13, 2015

(65) Prior Publication Data
US 2017/0015820 A1 Jan. 19, 2017

(30) Foreign Application Priority Data

Jul. 14, 2015 (KR) .......................... 10-2015-0099816

(51) Int. Cl.
C08L 23/06 (2006.01)
C08L 23/12 (2006.01)
C08L 23/16 (2006.01)
C08L 23/02 (2006.01)
C08L 23/00 (2006.01)

(52) U.S. Cl.
CPC ............... *C08L 23/02* (2013.01); *C08L 23/00* (2013.01); *C08L 2205/035* (2013.01); *C08L 2205/06* (2013.01)

(58) Field of Classification Search
None
See application file for complete search history.

(56) References Cited

U.S. PATENT DOCUMENTS

2015/0284560 A1* 10/2015 Lee .................. C08L 23/08
428/523

FOREIGN PATENT DOCUMENTS

| CN | 102827465 A | 12/2012 |
|---|---|---|
| KR | 2009-0131843 A | 12/2009 |
| KR | 10-2011-0116888 A | 10/2011 |
| KR | 10-2012-0047113 A | 5/2012 |
| KR | 10-2012-0093004 A | 8/2012 |
| KR | 10-2013-0008993 A | 1/2013 |
| KR | 10-2014-0001683 A | 1/2014 |
| KR | 10-1387887 B1 | 4/2014 |
| KR | 10-2014-0061248 A | 5/2014 |
| KR | 10-091016 | 5/2014 |
| KR | 10-1397927 B1 | 5/2014 |

OTHER PUBLICATIONS

Laxness, Keltan EP(D)M—Your General Purpose Specialty Elastomer Brochure, Order No. LXS-TRP 009, Edition Jan. 2012, Germany.

* cited by examiner

*Primary Examiner* — Vu A Nguyen
(74) *Attorney, Agent, or Firm* — Mintz Levin Cohn Ferris Glovsky and Popeo, P.C.; Peter F. Corless

(57) ABSTRACT

Disclosed are a resin composition and a molded article using the same. The resin composition may be obtained by mixing a thermoplastic vulcanizate and a polyethylene resin with a thermoplastic olefin resin, a polypropylene resin, an inorganic filler and a thermoplastic rubber, and in particular, the thermoplastic vulcanizate and the polyethylene resin may be obtained from biologically obtainable materials (biomass). Thus, the resin composition may be environmentally-friendly because it does not emit offensive odor of harmful compounds due to decreased generation of carbon dioxide and volatile organic compounds unlike petroleum-based materials. Further, superior mechanical properties such as elongation, hardness, strength, etc. that cannot be achieved only with conventional biodegradable resin may be ensured, and, at the same time, processability and moldability may be improved.

15 Claims, No Drawings

RESIN COMPOSITION AND MOLDED ARTICLE USING THE SAME

CROSS-REFERENCE TO RELATED APPLICATIONS

This application claims, under 35 U.S.C. §119, the priority of Korean Patent Application No. 10-2015-0099816, filed on Jul. 14, 2015, in the Korean Intellectual Property Office, the disclosure of which is incorporated herein by reference in its entirety.

TECHNICAL FIELD

The present invention relates to a resin composition and a molded article using the same. The resin composition may be obtained by mixing a thermoplastic vulcanizate and a polyethylene resin with a thermoplastic olefin resin, a polypropylene resin, an inorganic filler and a thermoplastic rubber, and in particular, the thermoplastic vulcanizate and the polyethylene resin may be obtained from biological material. As such, the resin composition may be environmentally-friendly because it does not emit offensive odor of harmful compounds due to decreased generation of carbon dioxide and volatile organic compounds in contrast to the petroleum-based materials. Further, superior mechanical properties such as elongation, hardness, strength, etc. that cannot be achieved only with the conventional biodegradable resin may be ensured, and, at the same time, processability and moldability may be improved.

BACKGROUND

Synthetic resins including a polyethylene resin, a polypropylene resin, a polyvinyl chloride resin, an acryl resin, a phenol resin, etc. have been generally and widely used in daily lives. For example, compositions containing such synthetic resins have been widely used in plastic molded articles and interior/exterior parts of vehicles because of excellent moldability, impact resistance, chemical resistance, low specific gravity and low cost.

However, a sheet prepared from the synthetic resin may be environmentally unfavorable because it causes environmental pollution during its preparation process and it cannot be recycled after use. Further, a petroleum-based synthetic resin may be harmful to the environment and human body because it generates volatile organic compounds at high concentrations, which may generate secondary pollutants such as photochemical oxides through photochemical reactions in the atmosphere.

In the related art, Korean Patent Publication No. 2012-0047113 discloses plastics prepared by using agricultural waste as a raw material to recycle waste resources and to reduce production cost, and a method for preparing the same. However, the produced plastics may have unsatisfactory mechanical properties.

In addition, Korean Patent Registration No. 091016 discloses a composition containing a polyolefin resin wherein ethylene and propylene are copolymerized. However, the environmental pollution problem may not be sufficiently solved because it contains common polyethylene and polyolefin resins.

Further, Korean Patent Publication No. 2009-0131843 discloses a polypropylene/soy protein composite material composition, a bio composite sheet using the same and a method for preparing the same. However, because soy protein may be used as it is, product quality may vary depending on the quality of the soy protein.

Accordingly, development of a new environmentally-friendly resin material that can replace the synthetic resin while reducing environmental pollution and emitting less volatile organic compounds, and an article using the same is necessary.

SUMMARY

In preferred aspects, the present invention provides a resin composition obtained by mixing a thermoplastic vulcanizate and a polyethylene resin with a thermoplastic olefin resin, a polypropylene resin, an inorganic filler and a thermoplastic rubber, and in particular, the thermoplastic vulcanizate and the polyethylene resin may include or be obtained from biologically obtainable components or from a biomass. As such, the resin composition may be environmentally-friendly because it does not emit offensive odor of harmful compounds due to decreased generation of carbon dioxide and volatile organic compounds unlike the petroleum-based materials and can ensure superior mechanical properties such as elongation, hardness, strength, and the like that cannot be achieved only with the currently used biodegradable resin, and at the same time, can improve processability and moldability. Accordingly, the present invention provides an environmentally-friendly resin composition which generates less carbon dioxide and volatile organic compounds.

The present invention also provides a molded article which exhibits improved processability and moldability while ensuring mechanical properties above a certain level.

Further, the present invention provides a method for manufacturing the molded article that can be recycled for other purposes through recycle processing.

In an aspect, the present invention provides a resin composition that may comprise: an amount of about 10-40 wt % of a thermoplastic vulcanizate; an amount of about 20-30 wt % of a polyethylene resin; an amount of about 30-50 wt % of a thermoplastic olefin resin; an amount of about 1-10 wt % of a polypropylene resin; and an amount of about 1-10 wt % of an inorganic filler, all the wt % based on the total weight of the resin composition. In particular, each the thermoplastic vulcanizate and the polyethylene resin may be obtained from a biomass. The term "biomass" as used herein refers to a biologically obtainable material or component from living, or deceased organisms, and the "biologically obtainable material" refers to a biological material or substance that is generated, produced, synthesized, excreted and/or disposed from the organisms. In certain aspects, the biomass may particularly refer to the biologically obtainable material or component from plants or animals, including materials from plants and animals, which may not be typically used for the purpose of food or feeding humans or live stocks. For example, the biomass may include various types of plants, crops, forest residues such as woods, branches, dried fibers from plants, solid wastes from animals, and debris from organisms which can be the directly or indirectly converted into resources such as material or energy (fuel) by means of biological or chemical process. Exemplary biomass as referred to herein may include materials from, for example, corn, artichoke, sugarcane, sugar beet and the like.

Preferably, the thermoplastic vulcanizate may comprise an oil or an ethylene propylene diene monomer (EPDM) derived from the biomass, or a mixture thereof. Further, the polyethylene resin may be one obtained by polymerizing ethylene prepared from dehydration of ethanol that is obtained from the biomass. In particular, the ethanol used for the polyethylene resin may be extracted from one or more selected from a group consisting of corn, artichoke, sugarcane and sugar beet.

Preferably, the thermoplastic olefin resin may be in at least one of fully crosslinked, semi-crosslinked and non-crosslinked states.

Preferably, the thermoplastic olefin resin may be one or more selected from a group consisting of polyethylene, polypropylene, polyamide, polycarbonate, polystyrene, styrene-acrylonitrile (SAN), acrylonitrile-butadiene-styrene (ABS) and poly(methyl methacrylate) (PMMA).

Preferably, the polypropylene resin is a homo polypropylene resin. In particular, the polypropylene resin may have a number-average molecular weight ($M_n$) of 30,000-40,000 and a melt index of 25-40 g/10 min (230° C., 2.16 kg).

Preferably, the inorganic filler may be one or more selected from a group consisting of calcium carbonate, calcium oxide, mica and talc.

The resin composition may further comprise an amount of about 1-20 wt % of a thermoplastic rubber, based on the total weight of the resin composition. Preferably, the thermoplastic rubber may be a copolymer of an amount of about 50-60 wt % of ethylene and an amount of about 40-50 wt % of a $C_2$-$C_{10}$ α-olefin, based on the total weigh of the thermoplastic rubber. In particular, the $C_2$-$C_{10}$ α-olefin may be one or more selected from a group consisting of propylene, butene, pentene, hexene and octene. Further, the thermoplastic rubber may be one or more selected from a group consisting of ethylene-propylene rubber (EPR), ethylene-propylene-diene rubber (EPDM), ethylene-butene rubber (EBR) and ethylene-octene rubber (EOR).

Further, provided are resin compositions that may consist of, consist essentially of, or essentially consist of the above mentioned components. For instance, the resin composition may consist of, consist essentially of, or essentially consist of: an amount of about 10-40 wt % of a thermoplastic vulcanizate; an amount of about 20-30 wt % of a polyethylene resin; an amount of about 30-50 wt % of a thermoplastic olefin resin; an amount of about 1-10 wt % of a polypropylene resin; and an amount of about 1-10 wt % of an inorganic filler, all the wt % based on the total weight of the resin composition.

In another aspect, the present invention provides a molded article manufactured using the resin composition as described above.

In another aspect, the present invention provides a method for manufacturing the molded article, and the method may comprise: preparing a mixture by mixing an amount of about 10-40 wt % of a bio thermoplastic vulcanizate, an amount of about 20-30 wt % of a bio polyethylene resin, an amount of about 30-50 wt % of a thermoplastic olefin resin, an amount of about 1-10 wt % of a polypropylene resin and an amount of about 1-10 wt % of an inorganic filler, all the wt % based on the total weight of the resin composition; and preparing the molded article by melting the mixture. In particular, as described above, each the thermoplastic vulcanizate and the polyethylene resin may be obtained from a biomass, or include biologically obtainable components.

Further provided are vehicles that comprise the molded article that is manufactured using the resin composition as described above.

The resin composition according to the present invention may comprise the thermoplastic vulcanizate and the polyethylene resin which may include or biologically obtainable components, and thus, the resin composition may be environmentally-friendly because it does not emit offensive odor of harmful compounds due to decreased generation of carbon dioxide and volatile organic compounds (VOCs) unlike the petroleum-based materials, and can be recycled for other purposes through recycle processing. Further, the resin composition may ensure superior mechanical properties such as elongation, hardness, strength and the like that cannot be achieved only with the currently used biodegradable resin, and thus, can improve processability and moldability at the same time.

In addition, because the resin composition of the present invention may have superior in terms of cost competitiveness and touch, a molded article using the same can be used in interior/exterior parts, flooring products, deco sheets, films, and the like of vehicles.

DETAILED DESCRIPTION

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in further detail.

The present invention provides a resin composition that may comprise: an amount of about 10-40 wt % of a thermoplastic vulcanizate (Bio TPV); an amount of about 20-30 wt % of a polyethylene (Bio PE) resin; an amount of about 30-50 wt % of a thermoplastic olefin (TPO) resin; an amount of about 1-10 wt % of a polypropylene (PP) resin; and an amount of about 1-10 wt % of an inorganic filler, all the wt % based on the total weight of the resin composition.

In an exemplary embodiment of the present invention, the resin composition particularly uses a thermoplastic vulcanizate and a polyethylene resin, which may be obtained from biomass. In addition, the resin composition may be environmentally-friendly because it does not emit offensive odor of harmful compounds due to decreased generation of carbon dioxide and volatile organic compounds (VOCs) unlike the petroleum-based materials, and may be recycled for other purposes through recycle processing. Specifically, whereas the conventional petroleum-based polyethylene material is produced while emitting carbon dioxide, the polyethylene resin of the present invention may be produced from polymerization of bioethanol that is obtained from sugarcane, etc. thereby decreasing generation of carbon dioxide.

The bioethanol as used herein refers a biologically obtainable ethanol which is produced through contemporary biological processes such as fermentation among other common alcohols.

The resin composition of the present invention may be obtained by mixing a thermoplastic vulcanizate and a polyethylene resin with a thermoplastic olefin resin, a polypropylene resin, an inorganic filler and a thermoplastic rubber. In particular, the thermoplastic vulcanizate and the polyethylene resin are obtained from biomass or biological material. Accordingly, the resin composition is capable of ensuring superior mechanical properties such as elongation, hardness, strength, etc. that cannot be achieved only with the existing biodegradable resin, and can improve processability and moldability at the same time.

Hereunder is given a detailed description of each component of the resin composition according to the present invention.

1. Thermoplastic Vulcanizate (Bio Thermoplastic Vulcanizate (Bio TPV))

In an exemplary embodiment of the present invention, the thermoplastic vulcanizate may be obtained from a biomass and, for example, may include a oil or a ethylene propylene diene monomer (EPDM) derived from a biomass or a mixture thereof. In particular, the thermoplastic vulcanizate may be one prepared by steps comprising adding polypropylene to the biologically obtainable oil or plant oil such as palm oil, the biologically obtainable EPDM or a mixture thereof and then performing crosslinking.

In an exemplary embodiment of the present invention, the thermoplastic vulcanizate may be used in an amount of about 10-40 wt % based on the total weight of the resin composition. When its content is less than about 10 wt %, manufacturing into a molded article may be difficult due to unsatisfactory physical properties such as strength (tensile strength or tearing strength), elongation, etc. And, when its content is greater than about 40 wt %, processing cost may increase.

2. Polyethylene Resin (Bio Polyethylene (Bio PE) Resin)

In an exemplary embodiment of the present invention, the polyethylene resin may be one obtained by steps comprising polymerizing ethylene prepared from dehydration of biologically obtainable ethanol. The ethanol may be derived from a plant as a biomass resource. For example, liquid fuels such as methanol, ethanol, diesel, and the like may be biologically obtained by processing a biomass. In particular, the ethanol used in the polyethylene resin may be one extracted from one or more selected from a group consisting of corn, artichoke, sugarcane and sugar beet. For example, the ethanol may be obtained by directly extracting a sugar from the sugarcane or the sugar beet and then performing alcoholic fermentation.

In an exemplary embodiment of the present invention, the polyethylene resin may be used in an amount of about 20-30 wt %. When its content is less than about 20 wt %, processability and moldability may be unsatisfactory. And, when its content is greater than about 30 wt %, processing cost may increase.

3. Thermoplastic Olefin (TPO) Resin

In an exemplary embodiment of the present invention, the thermoplastic olefin resin may be added to provide the resin composition with melt strength and adequate sagging property during vacuum molding and may be used in at least one of fully crosslinked, semi-crosslinked and non-crosslinked states. Particularly, the thermoplastic olefin resin in a fully crosslinked state may be used to prevent the elongation rate of the resin composition from increasing extremely and to prevent deterioration of trimming property after molding.

In addition, the thermoplastic olefin resin in a semi-crosslinked state may have a structure in which polypropylene chains may pass through the resin in a semi-crosslinked state and may serve to reduce deviation in thickness of the composition by making the resin composition stretch uniformly when it is elongated by an external force.

Moreover, the thermoplastic olefin resin in a non-crosslinked state may have lower melt strength than the thermoplastic olefin resin in a fully crosslinked or semi-crosslinked state but may have greater melt strength than a general olefin resin. When the thermoplastic olefin resin in a non-crosslinked state is used, ethylene propylene rubber (EPR) may be used as a thermoplastic rubber that may be added together. In this case, it is advantageous in that volatile organic compounds with offensive odor may not be generated and little change in physical properties may occur, because a crosslinking agent is not used.

In an exemplary embodiment of the present invention, the thermoplastic olefin resin may be one or more selected from a group consisting of polyethylene, polypropylene, polyamide, polycarbonate, polystyrene, styrene-acrylonitrile (SAN), acrylonitrile-butadiene-styrene (ABS) and poly(methyl methacrylate) (PMMA).

In an exemplary embodiment of the present invention, the thermoplastic olefin resin may be used in an amount of about 30-50 wt %, based on the total weight of the resin composition. When its content is less than about 30 wt %, calendering workability and moldability may be unsatisfactory due to decreased strength of the resin composition. And, when its content is greater than about 30 wt %, the resin composition may emit offensive odor of volatile organic compounds.

4. Polypropylene (PP) Resin

In an exemplary embodiment of the present invention, the polypropylene resin may be added to enhance the ability of maintaining shape by providing rigidity to the resin composition and anything known in the art may be used without limitation. In particular, a homo type polypropylene consisting only of polypropylene resin, which emits less offensive odor of volatile organic compounds and experiences less change in response to temperature or light, may be used.

The polypropylene resin may have a number-average molecular weight ($M_n$) of about 30,000-40,000 and a melt index of about 25-40 g/10 min (at a temperature of about 230° C., about 2.16 kg). In particular, the polypropylene resin may be one having a specific gravity of about 0.89-0.91, a Shore A hardness of about 90-97 and an elongation rate of about 20-30% in order to reduce the increased elongation rate of the resin composition.

In an exemplary embodiment of the present invention, the polypropylene resin may be used in an amount of about 1-10 wt % based on the total weight of the resin composition. When its content is less than about 1 wt %, moldability may be unsatisfactory during processing because the melt strength of the resin composition decreases rapidly and bursting may occur during vacuum molding because of hardening of the resin composition. Also, a molded article manufactured therefrom may have unsatisfactory texture. And, when the content is greater than about 10 wt %, a molded article manufactured therefrom may have unsatisfactory appearance quality.

5. Inorganic Filler

In an exemplary embodiment of the present invention, the inorganic filler may be used to enhance the mechanical properties of the resin composition and may be one or more selected from a group consisting of calcium carbonate, calcium oxide, mica and talc.

In an exemplary embodiment of the present invention, the inorganic filler may be used in an amount of about 1-10 wt % based on the total weight of the resin composition. When its content is less than about 1 wt %, the mechanical properties of the resin composition may be unsatisfactory and the composition may be sticky. And, when the content is greater than about 10 wt %, bursting of the resin composition may occur during molding because of increased hardness and decreased elongation rate of the composition. In particular, the inorganic filler may be one having a specific gravity of about 2.6 and being grade 4 or greater in accordance with the criterion for evaluation of odor for plastic products for use in interior parts of vehicles in the automobile industry.

6. Thermoplastic Rubber

In an exemplary embodiment of the present invention, the resin composition may further include an amount of about 1-20 wt % of a thermoplastic rubber, based on the total weight of the resin composition. In particular, the thermoplastic rubber may be added to improve the impact resistance of the resin composition and a copolymer of about 50-60 wt % of ethylene based on the total weight of the thermoplastic rubber and about 40-50 wt % of a $C_2$-$C_{10}$ α-olefin based on the total weight of the thermoplastic rubber may be used. When the content of the $C_2$-$C_{10}$ α-olefin is less than about 40 wt %, the processability of the resin composition may be unsatisfactory. And, when its content is greater than about 50 wt %, calendering processability may be unsatisfactory although surface texture is improved because of decreased hardness of the composition.

In an exemplary embodiment of the present invention, the $C_2$-$C_{10}$ α-olefin may be anything known in the related arts, without limitation. In particular, one or more selected from a group consisting of propylene, butene, pentene, hexene and octane may be used.

In an exemplary embodiment of the present invention, the thermoplastic rubber may be one or more selected from a group consisting of ethylene-propylene rubber (EPR), ethylene-propylene-diene rubber (EPDM), ethylene-butene rubber (EBR) and ethylene-octene rubber (EOR). Preferably, ethylene-octene rubber (EOR) may be used.

In particular, the ethylene-octene rubber (EOR) may be contained to overcome the drawback of the thermoplastic olefin resin added to the resin composition, such as low strength and volatile organic compounds with offensive odor. The ethylene-octene rubber may provide a melt strength similar to that of the thermoplastic olefin resin to resin composition in combination with the inorganic filler and improve the odor of the composition.

The grade of the ethylene-octene rubber (EOR) is generally classified according to its octene content. The octene content may be of about 40-50 wt %, or particularly of about 40-45 wt %, based on the weight of the ethylene-octene rubber.

In an exemplary embodiment of the present invention, the thermoplastic rubber may be used in an amount of about 1-20 wt %. When its content is less than about 1 wt %, sagging may occur excessively in a molded article during vacuum molding because of decreased melt strength of the resin composition, resulting in wrinkles on the surface of the molded article. And, when the content is greater than about 20 wt %, the resin composition may emit offensive odor of volatile organic compounds.

In another aspect, the present invention also provides a molded article manufactured using the resin composition comprising biologically obtainable components as described above.

The method for manufacturing a molded article of the present invention may include: preparing a mixture by mixing an amount of about 10-40 wt % of a thermoplastic vulcanizate, an amount of about 20-30 wt % of a polyethylene resin, an amount of about 30-50 wt % of a thermoplastic olefin resin, an amount of about 1-10 wt % of a polypropylene resin and an amount of about 1-10 wt % of an inorganic filler, as all the wt % based on the total weight of the resin composition; and manufacturing the molded article by melting the mixture. In particular, the thermoplastic vulcanizate and the polyethylene resin may include or be obtained from biologically obtainable components.

In an exemplary embodiment of the present invention, the molded article may be manufactured by melting the thus prepared mixture and passing it through a calender roll. The melting of the mixture may be performed according to a commonly employed method using a single screw extruder, a twin screw extruder, a kneader or a Banbury mixer, but limitations may not be limited thereto. And, the calendering may be performed according to a common method known in the art to which the present invention belongs.

Accordingly, the resin composition according to the present invention comprising the thermoplastic vulcanizate and the polyethylene resin which may be obtained from biologically obtainable components may be environmentally-friendly because it does not emit offensive odor of harmful compounds due to decreased generation of carbon dioxide and volatile organic compounds (VOCs) unlike the petroleum-based materials, and can be recycled for other purposes through recycle processing.

Also, the resin composition of the present invention, which is obtained by mixing the thermoplastic vulcanizate and the polyethylene resin with a thermoplastic olefin resin, a polypropylene resin, an inorganic filler and a thermoplastic rubber, is capable of ensuring superior mechanical properties such as elongation, hardness, strength, and the like that cannot be achieved only with the existing biodegradable resin, and can improve processability and moldability at the same time.

In addition, because the resin composition of the present invention may be superior in terms of cost competitiveness and touch, a molded article using the same can be used in interior/exterior parts, flooring products, deco sheets, films, and the like of vehicles. In particular, the molded article may be prepared into a sheet, a film, and the like for use in interior/exterior parts of vehicles. Since the molded article has superior physical properties such as solvent resistance, wear resistance, scratch resistance, light resistance, heat resistance, chemical resistance, and the like and is environmentally-friendly, it may be used for surface materials of interior parts of vehicles to improve mood inside vehicles without giving off offensive odor.

EXAMPLE

The present invention will be described in more detail through examples. The following examples are for illustrative purposes only and it will be apparent to those skilled in the art that the scope of this invention is not limited by the examples.

Examples 1-3 and Comparative Examples 1-3

Resin compositions were prepared with the ingredients of the compositions and contents described in Table 1. Each of the resin compositions was melted, compressed into a sheet between rolls, and then calendered to obtain a sheet.

TABLE 1

|  | Examples (wt %) | | | Comparative Examples (wt %) | | |
| --- | --- | --- | --- | --- | --- | --- |
|  | 1 | 2 | 3 | 1 | 2 | 3 |
| Bio thermoplastic vulcanizate | 20 | 25 | 30 | — | 30 | 20 |
| Bio polyethylene resin | 25 | 25 | 25 | — | 15 | 35 |
| Thermoplastic olefin resin | 40 | 41 | 36 | 65 | 46 | 36 |
| Homo polypropylene resin | 3 | 3 | 3 | 3 | 3 | 3 |
| Filler | 4 | 4 | 4 | 4 | 4 | 4 |
| Thermoplastic rubber | 8 | 2 | 2 | 8 | 2 | 2 |
| LDPE resin | — | — | — | 20 | — | — |

Bio thermoplastic vulcanizate: Shore A hardness 65, melt index (MI) 0.9 (230° C./5 kg), specific gravity 0.88.
Bio polyethylene resin: melt index (MI) 2 (190° C./2.16 kg), specific gravity 0.9, tensile strength 40 MPa, elongation rate 1100%.
Thermoplastic olefin resin: Shore A hardness 90, melt index (MI) 0.7 (230° C./2.16 kg), specific gravity 0.90, elongation rate 640%.
Homo polypropylene resin: B 330F, SK Energy.
Filler: calcium carbonate (White-H, Omya).
Thermoplastic rubber: ethylene-octene rubber resin (EOR), Engage8180, Dow.
LDPE resin: low density polyethylene resin.

Test Example 1: Evaluation of Physical Properties

The physical properties of the sheets prepared in Examples 1-3 and Comparative Examples 1-3 were measured by the methods described below. The result is given in the following Table 3.

[Evaluation Methods]

(1) Tensile Strength and Elongation

Tensile strength and elongation were measured according to ASTM D 638 using a tensile tester. Maximum load per given area and elongation were measured under the condition of a test speed of 200 mm/min and a distance between reference points of 70 mm using a type 1 test specimen.

(2) Tearing Strength

Tearing strength was measured as a load average according to KS M6518 by clamping a dumbbell type B test specimen to a tensile tester under the condition of a tensile speed of 200 mm/min.

(3) Thermal Aging Resistance

Thermal aging resistance was measured by keeping a test specimen in a forced convention oven maintained at 110±2° C. for 300 hours and determining $\Delta E_{cmc}$ at an angle of 45° using a spectrophotometer and evaluating the change in color with naked eyes according to the gray scale specified in ISO 105-A02.

(4) Photoaging Resistance

Photoaging resistance was measured by irradiating light to a test specimen using a tester specified in ISO 105 under the condition of a black panel temperature of 89±3° C., a controlled humidity of 50±5% RH and 126 MJ/m$^2$ and evaluating the change in color with naked eyes according to the gray scale specified in ISO 105-A02.

(5) Chemical Resistance

Chemical resistance was measured by wiping the surface of a test specimen 10 times with a gauze which had been sufficiently immersed in a test solution described in the following Table 2, allowing it to stand at room temperature for 1 hour and evaluating the change in color with naked eyes according to the gray scale specified in ISO 105-A02.

TABLE 2

| Test solution | Description |
| --- | --- |
| Glass cleaner | Weakly alkaline glass cleaner |
| Cleaner | Mixture of 95% distilled water and 5% neutral detergent |
| Washer | Mixture of 50% isopropyl alcohol and 50% distilled water |
| Gasoline | Unleaded gasoline |
| Polish wax | HMC |

(6) Sunscreen Resistance

Sunscreen resistance was measured according to GMN 10033 by stacking two sheets of white cotton cloth of the same size on an aluminum plate (50 mm×50 mm) and applying 0.25 g of sunscreen (Coppertone Waterbabies SPF 45) on the entire surface thereof. After placing a test specimen on the aluminum plate and pressing with a load of 500 g, the assembly was kept in a constant-temperature bath at 80±2° C. for 1 hour. After removing the white cotton cloth and the aluminum plate, the test specimen was kept at room temperature for about 10-15 minutes, washed with a neutral detergent and then dried. Then, the change in color was evaluated with naked eyes. Evaluation was made as superior when there was little change in color, as good when the change in color was slight, as moderate when there was change in color but there was no deterioration in quality, and as poor when the change in color was severe.

(7) Odor of Volatile Organic Compounds

A 4-L glass container was heated at 100° C. for about 1 hour and was kept at room temperature for 1 hour to remove odor in the glass container. A test specimen cut to a size of 50 mm×60 mm was heated at 100° C. for 2 hours in the glass container. After cooling by keeping at room temperature (23±2° C.) for 60 minutes, odor was evaluated after opening the lid of the container about 3-4 cm. The intensity of odor was quantified by assigning 5 points when the odor was severe, 3 points when the odor was moderate, and 1 point when there was little odor.

(8) Calendering Processability

Processability and surface state were evaluated with naked eyes after producing sheets by melting the resin compositions, compressing them into sheets between rolls, and then calendering the sheets. Evaluation was made as poor when unmelted resin components remained on the surface or the surface was rough due to unsatisfactory flowability, and as good when there were no such problems.

(9) Vacuum/Injection Moldability

It was evaluated whether a molded sheet which had been subjected to calendering, surface treatment and lamination processes had appearance problems during vacuum molding and injection molding. The difference in sagging property due to the difference in melt strength of the resin leads to bursting and abrupt thickness decrease of the molded sheet during vacuum molding. The moldability was evaluated as good when the thickness of the part of a passenger air bag (PAB) was 0.60 mm or greater.

(10) Adhesiveness with Injected Resin

Adhesiveness with an injected resin was evaluated after vacuum molding. The adhesiveness was evaluated as good if peeling did not occur when the molded sheet forcibly peeled off, and as poor if peeling occurred.

TABLE 3

|  | Unit | Examples | | | Comparative Examples | | |
|---|---|---|---|---|---|---|---|
|  |  | 1 | 2 | 3 | 1 | 2 | 3 |
| Tensile strength | kgf/cm$^2$ | 180 | 177 | 185 | 140 | 135 | 125 |
| Tearing strength | kgf/cm | 8.5 | 8.5 | 8.1 | 6.4 | 6.9 | 6.5 |
| Elongation | % | 718 | 739 | 738 | 649 | 592 | 642 |
| Thermal aging resistance | Grade | 5 | 5 | 5 | 3 | 3 | 2 |
| Photoaging resistance | Grade | 4 | 5 | 4 | 4 | 3 | 1 |
| Chemical resistance | Grade | 4 | 4 | 5 | 3 | 4 | 3 |
| Sunscreen resistance | — | Good | Good | Good | Good | Good | Good |
| Odor | Grade | 4 | 5 | 4 | 4 | 2 | 3 |
| Calendering processability | — | Good | Good | Good | Good | Poor | Good |
| Vacuum/injection moldability | — | Good | Good | Good | Good | Poor | Poor |
| Adhesiveness with injected resin | — | Good | Good | Good | Good | Good | Poor |

From Table 3, it was confirmed that Examples 1-3 showed substantially improved physical properties, in particular, tensile strength, tearing strength and elongation, as compared to Comparative Examples 1-3. They also satisfied the physical property requirements for molded articles such as processability, moldability and reliability (thermal aging resistance, photoaging resistance, chemical resistance, sunscreen resistance and odor). Therefore, it was confirmed that particular problems about properties did not occur when molded articles were prepared using the compositions.

In contrast, Comparative Example 1 wherein the thermoplastic vulcanizate and the polyethylene resin, which were obtained from biomass, were not included showed poor mechanical properties, in particular, tensile strength, tearing strength and elongation.

And, Comparative Example 2 wherein a small amount of the polyethylene resin was included showed very poor mechanical properties such as tensile strength, tearing strength and elongation, emitted odor, showed poor surface state during calendering processing because of formation of an unmelted part, and showed poor moldability with the thickness of the part of the passenger air bag being 0.60 mm or smaller due to decreased sagging property during vacuum molding.

For Comparative Example 3 wherein the polyethylene resin was used in an excess amount, although calendering processability was good, photoaging resistance and thermal aging resistance were poor because discoloration occurred, and vacuum/injection moldability and adhesiveness with injected resin were also poor.

Accordingly, it was confirmed that the resin compositions prepared in Examples 1-3 exhibit superior mechanical properties and can be subjected to vacuum molding and injection molding while maintaining calendering processability.

Test Example 2: Evaluation of Concentration of Total Volatile Organic Compounds (TVOCs)

The concentration of total volatile organic compounds and individual volatile organic compounds was measured for the sheets prepared in Examples 1-3 and Comparative Example 1. The result is shown in Table 4.

[Method and Criterion of Evaluation]

For Examples 1-3 and Comparative Examples 1-3, the concentration of total volatile organic compounds (TVOCs) was measured. The concentration of total volatile organic compounds refers to a value obtained by collectively measuring the concentration of all the volatile organic compounds existing in the air because it is not easy to quantify their concentration individually.

The standard for indoor air quality recommended by Article 7-2 of the Industrial Safety and Health Act is 500 µg/m$^3$ or less of total volatile organic compounds (TVOCs), 30 µg/m$^3$ or less of benzene, 1,000 µg/m$^3$ toluene, 360 µg/m$^3$ or less of ethylbenzene, 700 µg/m$^3$ or less of xylene, 300 µg/m$^3$ or less of styrene, and 210 µg/m$^3$ or less of formaldehyde.

TABLE 4

|  | Unit | Examples | | | Comparative Examples 1 |
|---|---|---|---|---|---|
|  |  | 1 | 2 | 3 |  |
| TVOCs | µg/m$^3$ | 161 | 142 | 148 | 687 |
| Benzene | µg/m$^3$ | <10 | <10 | <10 | <10 |
| Toluene | µg/m$^3$ | 770 | 630 | 650 | 27,000 |
| Ethylbenzene | µg/m$^3$ | 290 | 170 | 250 | 10,800 |
| Xylene | µg/m$^3$ | 118 | 82 | 100 | 7,400 |
| Styrene | µg/m$^3$ | <10 | <10 | <10 | <10 |
| Formaldehyde | µg/m$^3$ | 95 | 52 | 73 | 56 |

As seen from Table 4, Examples 1-3 satisfied the recommended standard for indoor air quality not only for the total volatile organic compounds (TVOCs) but also for all the volatile organic compounds (VOCs) such as benzene, toluene, ethylbenzene, xylene and styrene.

In contrast, Comparative Example 1 did not satisfy the recommended standard for indoor air quality for the total volatile organic compounds (TVOCs) and the volatile organic compounds (VOCs) such as benzene, toluene, ethylbenzene, xylene and styrene. In addition, it can be seen that the harmful volatile organic compounds are emitted to the air at very high concentrations because their concentrations included in the resin composition are very high.

Accordingly, it can be seen that Examples 1-3 wherein the thermoplastic vulcanizate and the polyethylene resin are contained are environment-friendly because it does not emit offensive odor of harmful compounds due to decreased generation of volatile organic compounds as compared to Comparative Example 1 wherein a low-density polyethylene (LDPE) resin is contained.

As described above, the resin composition of the present invention may be obtained by mixing a thermoplastic vulcanizate and a polyethylene resin with a thermoplastic olefin resin, a polypropylene resin, an inorganic filler and a thermoplastic rubber, and in particular, the thermoplastic vulcanizate and the polyethylene resin may include or be obtained from biologically obtainable components. Thus, the resin composition is capable of ensuring superior mechanical properties such as elongation, hardness, strength, and the like that cannot be achieved only with the currently used biodegradable resin, and can improve processability and moldability at the same time.

What is claimed is:
1. A resin composition comprising:
    an amount of about 10-40 wt % of a thermoplastic vulcanizate;
    an amount of about 20-30 wt % of a polyethylene resin;
    an amount of about 30-50 wt % of a thermoplastic olefin resin;
    an amount of about 1-10 wt % of a polypropylene resin; and
    an amount of about 1-10 wt % of an inorganic filler,
    all the wt % based on the total weight of the resin composition, wherein each of the thermoplastic vulcanizate and the polyethylene resin is obtained from a biomass, wherein the thermoplastic vulcanizate comprises an oil or an ethylene propylene diene monomer (EPDM) derived from the biomass, or a mixture thereof, wherein the polyethylene resin is one obtained by polymerizing ethylene prepared from dehydration of ethanol that is obtained from the biomass, and wherein the thermoplastic olefin resin is in non-cross-linked states.

2. The resin composition according to claim 1, wherein the ethanol is extracted from one or more selected from a group consisting of corn, artichoke, sugarcane and sugar beet.

3. The resin composition according to claim 1, wherein the polypropylene resin is a homo polypropylene resin.

4. The resin composition according to claim 1, wherein the polypropylene resin has a number-average molecular weight ($M_n$) of 30,000-40,000 and a melt index of 25-40 g/10 min (230° C., 2.16 kg).

5. The resin composition according to claim 1, wherein the inorganic filler is one or more selected from a group consisting of calcium carbonate, calcium oxide, mica and talc.

6. The resin composition according to claim 1, wherein the resin composition further comprises an amount of about 1-20 wt % of a thermoplastic rubber.

7. The resin composition according to claim 6, wherein the thermoplastic rubber is a copolymer of an amount of about 50-60 wt % of ethylene and an amount of about 40-50 wt % of a $C_2$-$C_{10}$ α-olefin.

8. The resin composition according to claim 7, wherein the $C_2$-$C_{10}$ α-olefin is one or more selected from a group consisting of propylene, butene, pentene, hexene and octene.

9. The resin composition according to claim 6, wherein the thermoplastic rubber is one or more selected from a group consisting of ethylene-propylene rubber (EPR), ethylene-propylene-diene rubber (EPDM), ethylene-butene rubber (EBR) and ethylene-octene rubber (EOR).

10. The resin composition of claim 1, consisting essentially of:
    an amount of about 10-40 wt % of a thermoplastic vulcanizate;
    an amount of about 20-30 wt % of a polyethylene resin;
    an amount of about 30-50 wt % of a thermoplastic olefin resin;
    an amount of about 1-10 wt % of a polypropylene resin; and
    an amount of about 1-10 wt % of an inorganic filler,
    all the wt % based on the total weight of the resin composition.

11. The resin composition of claim 1, consisting of:
    an amount of about 10-40 wt % of a thermoplastic vulcanizate;
    an amount of about 20-30 wt % of a polyethylene resin;
    an amount of about 30-50 wt % of a thermoplastic olefin resin;
    an amount of about 1-10 wt % of a polypropylene resin; and
    an amount of about 1-10 wt % of an inorganic filler,
    all the wt % based on the total weight of the resin composition.

12. A molded article comprising a resin composition of claim 1.

13. A method for manufacturing a molded article, comprising:
    obtaining a thermoplastic vulcanizate and a polyethylene resin respectively from a biomass,
    preparing a mixture by mixing an amount of about 10-40 wt % of the thermoplastic vulcanizate, an amount of about 20-30 wt % of the polyethylene resin, an amount of about 30-50 wt % of a thermoplastic olefin resin, an amount of about 1-10 wt % of a polypropylene resin and an amount of about 1-10 wt % of an inorganic filler, all the wt % based on the total weight of the resin composition; and
    manufacturing the molded article by steps comprising melting the mixture,
    wherein the thermoplastic vulcanizate comprises an oil or an ethylene propylene diene monomer (EPDM) derived from the biomass, or a mixture thereof,
    wherein the polyethylene resin is one obtained by polymerizing ethylene prepared from dehydration of ethanol that is obtained from the biomass, and
    wherein the thermoplastic olefin resin is in non-cross-linked states.

14. The method of claim 11, wherein the mixture is melted using a single screw extruder, a twin screw extruder, a kneader or a Banbury mixer.

15. A vehicle comprising a molded article manufactured using a resin composition of claim 1.

* * * * *